(12) United States Patent
Tsukagoshi

(10) Patent No.: US 10,187,646 B2
(45) Date of Patent: Jan. 22, 2019

(54) ENCODING DEVICE, ENCODING METHOD, TRANSMISSION DEVICE, DECODING DEVICE, DECODING METHOD, AND RECEPTION DEVICE

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 673 days.

(21) Appl. No.: 14/892,043

(22) PCT Filed: Aug. 8, 2014

(86) PCT No.: PCT/JP2014/071105
§ 371 (c)(1),
(2) Date: Nov. 18, 2015

(87) PCT Pub. No.: WO2015/025747
PCT Pub. Date: Feb. 26, 2015

(65) Prior Publication Data
US 2016/0112709 A1    Apr. 21, 2016

(30) Foreign Application Priority Data
Aug. 22, 2013 (JP) ................. 2013-172734

(51) Int. Cl.
*H04N 19/177* (2014.01)
*H04N 19/70* (2014.01)
(Continued)

(52) U.S. Cl.
CPC ......... *H04N 19/177* (2014.11); *H04N 19/107* (2014.11); *H04N 19/114* (2014.11);
(Continued)

(58) Field of Classification Search
CPC .. H04N 19/177; H04N 19/188; H04N 19/172; H04N 19/187; H04N 19/593
See application file for complete search history.

(56) References Cited

U.S. PATENT DOCUMENTS

| 5,317,397 A | 5/1994 | Odaka et al. |
| 2009/0041130 A1* | 2/2009 | Yoon .............. H04N 21/234327 |
| | | 375/240.26 |

(Continued)

FOREIGN PATENT DOCUMENTS

| JP | 5-111012 A | 4/1993 |
| WO | 2012/172811 A1 | 12/2012 |

OTHER PUBLICATIONS

Extended Search Report dated Feb. 15, 2017 in European Patent Application No. 14837995.1.

(Continued)

*Primary Examiner* — Shawn S An
(74) *Attorney, Agent, or Firm* — Oblon, McClelland, Maier & Neustadt, L.L.P.

(57) ABSTRACT

To enable image data of the interlacing scheme to undergo encoding of an open GOP. An image encoding unit encodes image data of each picture constituting image data in an interlacing scheme in an NAL unit structure and generates a video stream having the encoded image data of each picture. The image encoding unit sets an NAL unit type of a slice of encoded image data of a picture forming a field pair with an intra picture constituting a random access point to a unique type which indicates a picture that is dependent on the intra picture and forms the field pair with the intra picture.

10 Claims, 14 Drawing Sheets

(51) Int. Cl.
*H04N 19/107* (2014.01)
*H04N 19/114* (2014.01)
*H04N 19/16* (2014.01)
*H04N 19/174* (2014.01)
*H04N 19/169* (2014.01)
*H04N 19/172* (2014.01)
*H04N 19/187* (2014.01)
*H04N 19/593* (2014.01)
*H04N 19/31* (2014.01)

(52) U.S. Cl.
CPC ........... *H04N 19/16* (2014.11); *H04N 19/172* (2014.11); *H04N 19/174* (2014.11); *H04N 19/187* (2014.11); *H04N 19/188* (2014.11); *H04N 19/31* (2014.11); *H04N 19/593* (2014.11); *H04N 19/70* (2014.11)

(56) References Cited

U.S. PATENT DOCUMENTS

2009/0067496 A1* 3/2009 Ying ............... H04N 19/105 375/240.15
2014/0098892 A1  4/2014 Abe et al.

OTHER PUBLICATIONS

Barroux G. et al., "Proposal of interlace coding tools for HEVC", Motion Picture Expert Group of ISO/IEC JTC1/SC29/WG11, No. m30452, Jul. 213, XP030058979, pages.

Byeongdoo Choi B. et al., "MV-HEVC/SHVC HLS: Random access of multiple layers", 14,JCT-VC Meting; JOING Collaborative Team on Video Coding of ITU-TSG.16 WP3 and ISO/IEC JTC1/SC29/WG11, Documents JCTVC—No. 121, Jul. 18, 2013, XP030114578.

Byeongdoo Choi et al., "On random access point for HEVC extension", 13. JCT-VC Meeting/ 104. MPG Meeting JOING Collaborative Team on Video Coding of ITU-T SG. 16 WP 3 ISO/IEC JTC1/SC29/WG11. Documents JCTVC-M0168, Apr. 2013, XP030114125.

Rickard Sjöberg et al., "RExt HLS: Picture referencing across CRA pictures", 17. JCT-VC meeting, JOING Collaborative Team on Video Coding of ITU-T.SG.16 WP3 and ISO/IEC JTC1/SC 29/WG11, Mar. 2014, XP030116038, Document: JCTVC-Q0116_v2, 4 pages.

Kazuo Sugimoto, et al., "HEVC performance evaluation on interlaced video sequences", Joint Collaborative Team on Video Coding (JCT-VC) of ITU-T SG 16 WP 3 and ISO/IEC JTC 1/SC 29/WG 11, Mitsubishi Electric Corporation, Total 5 Pages, (Oct. 10-19, 2012).

Rickard Sjoberg, et al., "RExt HLS: Picture referencing across CRA pictures", Joint Collaborative Team on Video Coding (JCT-VC) of ITU-T SG 16 WP 3 and ISO/IEC JTC 1/SC 29/WG 11, Ericsson, Total 3 Pages, (Jan. 9-17, 2014).

Gary J. Sullivan, et al., "Overview of the High Efficiency Video Coding (HEVC) Standard" IEEE Transactions on Circuits and Systems for Video Technology, vol. 22, No. 12, pp. 1649-1688, (Dec. 2012).

International Search Report dated Nov. 4, 2014 in PCT/JP14/071105 Filed Aug. 8, 2014.

* cited by examiner

EXAMPLE OF HIERARCHICAL ENCODING OF INTERLACED PICTURE

FIG.3

(a)
```
nal_unit_header( ) {                          Descriptor
        forbidden_zero_bit                    f(1)
        nal_unit_type                         u(6)
        nuh_layer_id                          u(6)
        nuh_temporal_id_plus1                 u(3)
}
```

(b)
Semantics

Forbidden_zero_bit      (1bit)
    0 IS NECESSARY.
Nal_unit_type      (6bits)
    VALUE IS DECIDED FOR EACH NAL UNIT BELOW.

| AUD | VPS | SPS | PPS | PSEI | SLICE | SSEI | EOS |

Nuh_layer_id      (6bits)
    0 IS ASSUMED
Nuh_temporal_id_plus1   (3bits)
    INDICATE temporal_id. VALUE (1 to 7) OBTAINED BY ADDING 1 IS SET.
    VALUE OF temporal_id IS 0 TO 6.

FIG.4

| GOP LEADING PICTURE | AUD | VPS | SPS | PPS | PSEI | SLICE | SSEI | EOS |

| OTHER THAN GOP LEADING PICTURE | AUD | PPS | PSEI | SLICE | SSEI | EOS |

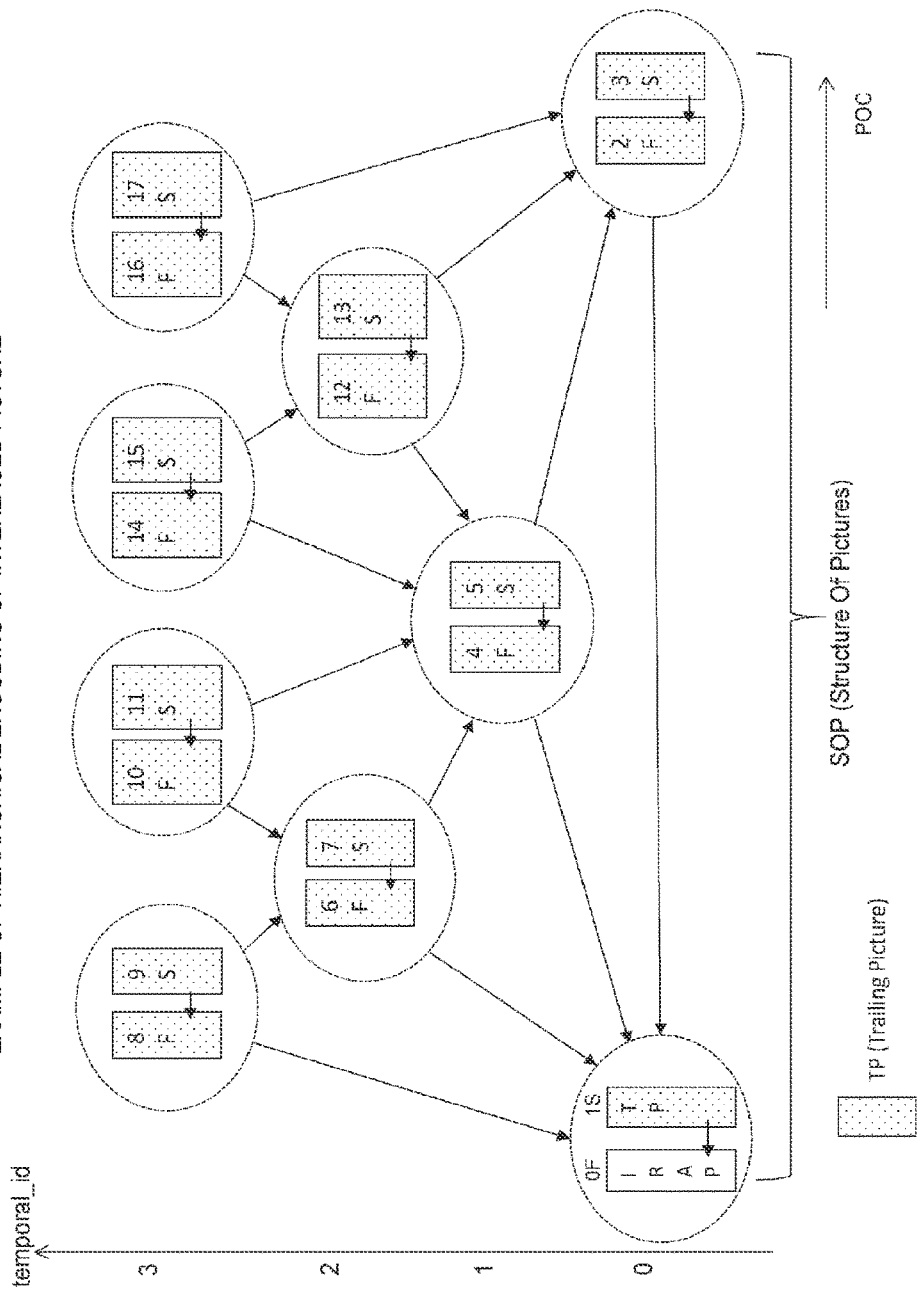

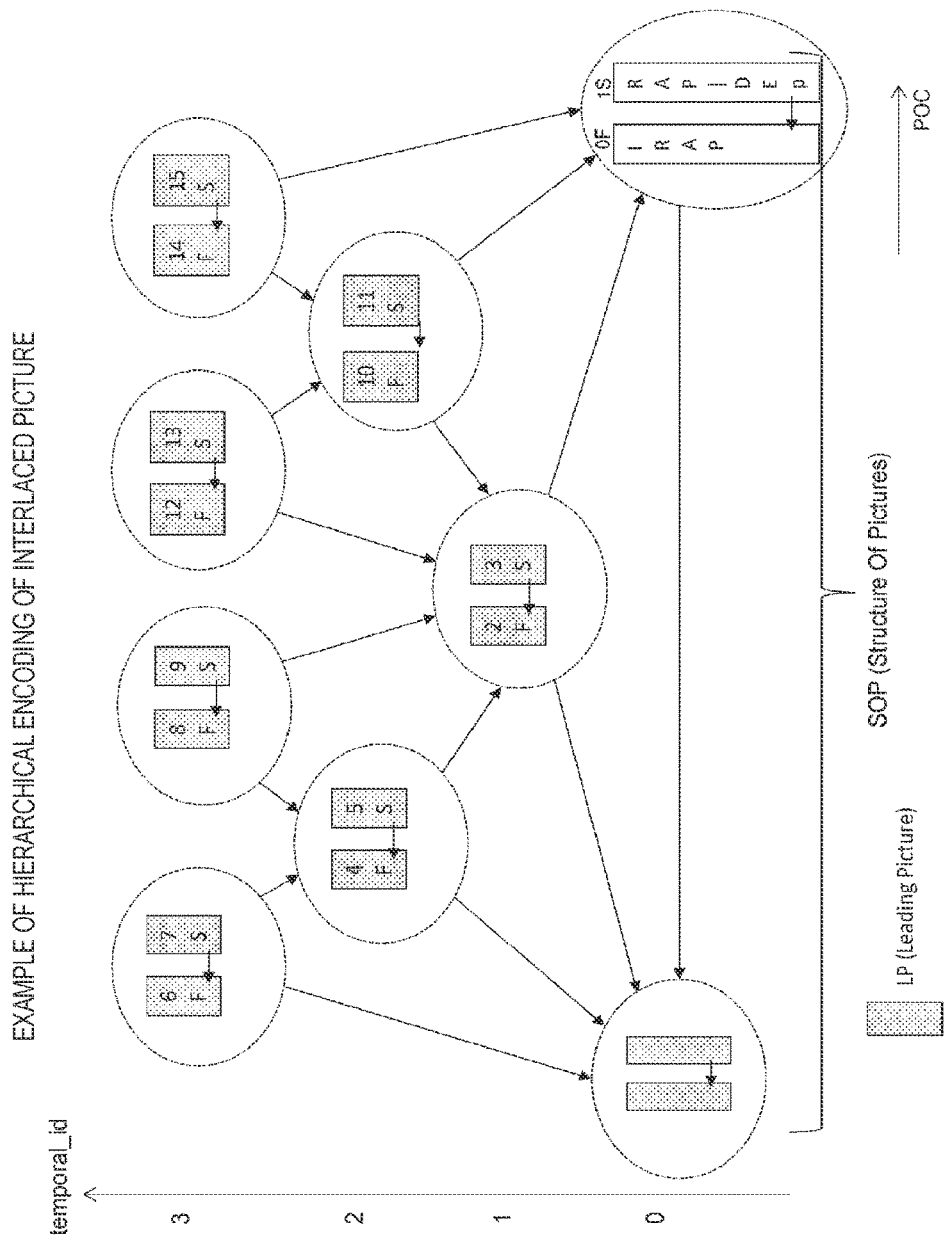

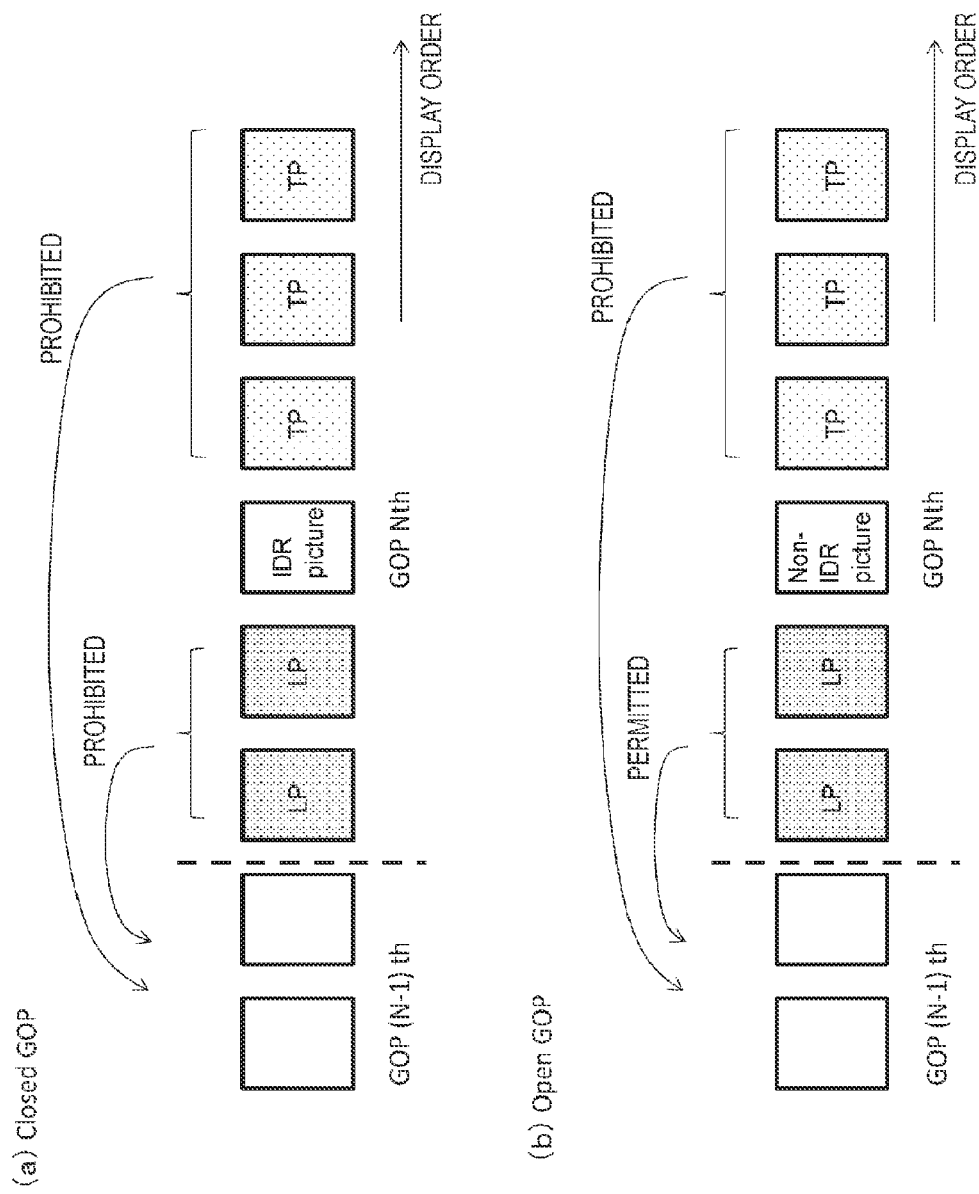

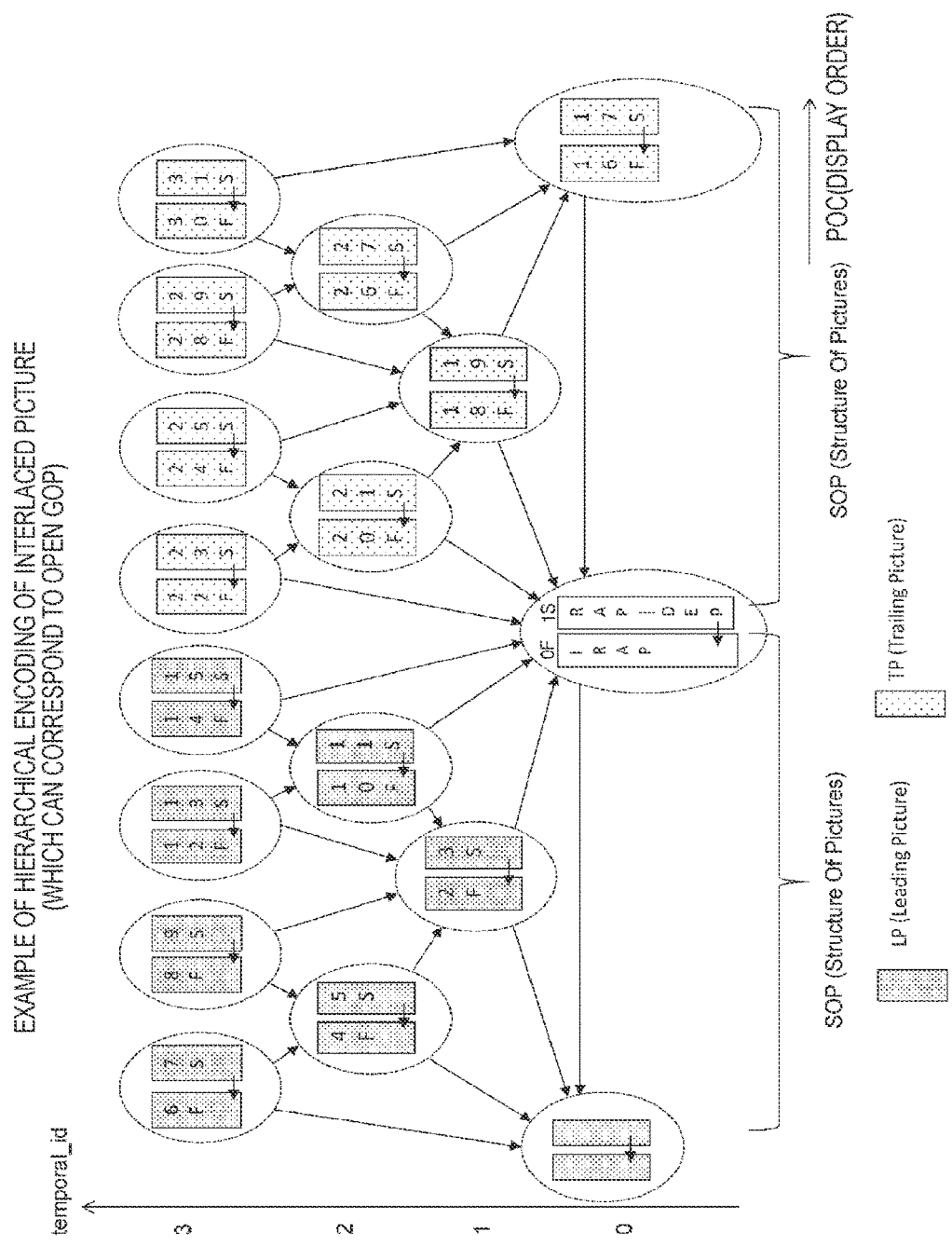

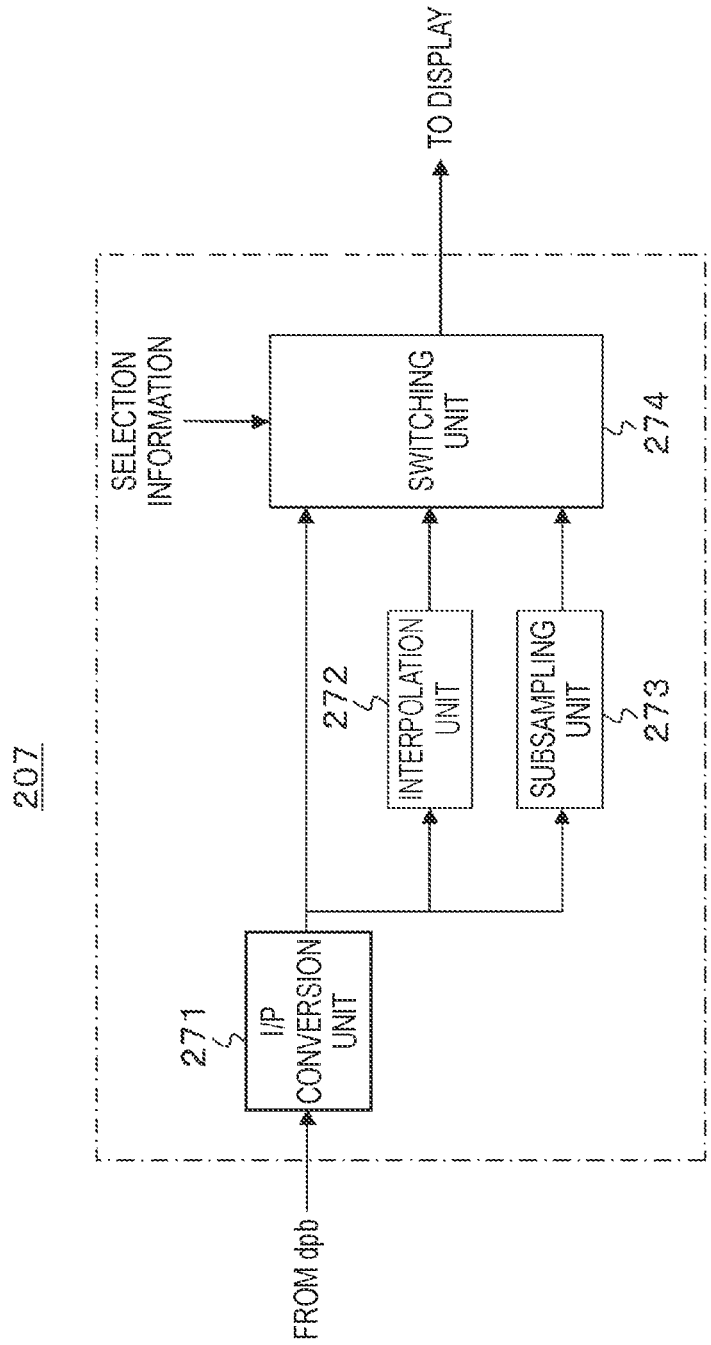

ENCODING DEVICE, ENCODING METHOD, TRANSMISSION DEVICE, DECODING DEVICE, DECODING METHOD, AND RECEPTION DEVICE

TECHNICAL FIELD

The present technology relates to an encoding device, an encoding method, a transmission device, a decoding device, a decoding method, and a reception device. More particularly, the present technology relates to an encoding device which encodes image data in an interlacing scheme in an NAL unit structure.

BACKGROUND ART

Encoding schemes of encoding image data in an NAL unit structure are known in the related art. For example, Non-Patent Literature 1 discloses encoding in a High Efficiency Video Coding (HEVC) scheme.

CITATION LIST

Non-Patent Literature

Non-Patent Literature 1: "Overview of the High Efficiency Video Coding (HEVC) Standard" written by Gary J. Sullivan, Jens-Rainer Ohm, Woo-Jin Han, and Thomas Wiegand, IEEE TRANSACTIONS ON CIRCUITS AND SYSTEMS FOR VIDEO TECNOROGY, VOL. 22, NO. 12, pp. 1649-1668, December 2012.

SUMMARY OF INVENTION

Technical Problem

When image data of the interlacing scheme is encoded in the HEVC scheme, if a picture forming a field pair with an intra picture constituting a random access point is set to a trailing picture (TP), there is no way to insert a leading picture (LP). Thus, in that case, it is not possible to encode an open Group of Pictures (open GOP).

An objective of the present technology is to enable image data of the interlacing scheme to undergo encoding of an open GOP.

Solution to Problem

A concept of the present technology is an encoding device including: an image encoding unit configured to encode image data of each picture constituting image data in an interlacing scheme in an NAL unit structure and generate a video stream having the encoded image data of each picture. The image encoding unit sets an NAL unit type of a slice of encoded image data of a picture forming a field pair with an intra picture constituting a random access point to a unique type which indicates a picture that is dependent on the intra picture and forms the field pair with the intra picture.

In the present technology, the image encoding unit encodes image data of each picture constituting image data in the interlacing scheme in the NAL unit structure, and thereby generates a video stream having the image data of each picture. For example, the image encoding unit may classify the image data of each picture constituting the image data in the interlacing scheme into a plurality of layers, encode the image data of pictures of each classified layer, and thereby generate a video stream having the encoded image data of the pictures of each layer. In addition, for example, the image encoding unit may encode the image data in the interlacing scheme in the HEVC scheme.

Here, the NAL unit type of a slice of encoded image data of a picture forming a field pair with an intra picture constituting a random access point is set to a unique type which indicates a picture that is dependent on the intra picture and forms the field pair with the intra picture. For this reason, an LP can be inserted as a succeeding picture and thus encoding of an open GOP becomes possible.

Another concept of the present technology is a decoding device including: an image decoding unit configured to decode a video stream having encoded image data of each picture obtained by encoding image data of each picture constituting image data in an interlacing scheme in an NAL unit structure to obtain the image data in the interlacing scheme. In the video stream, an NAL unit type of a slice of encoded image data of a picture forming a field pair with an intra picture constituting a random access point is set to a unique type which indicates a picture that is dependent on the intra picture and forms the field pair with the intra picture.

In the present technology, the image decoding unit decodes a video stream and thereby obtains image data in the interlacing scheme. This video stream has encoded image data of each picture obtained by encoding image data of each picture constituting the image data in the interlacing scheme in the NAL unit structure.

In the video stream, the NAL unit type of a slice of encoded image data of a picture forming a field pair with an intra picture constituting a random access point is set to a unique type which indicates a picture that is dependent on the intra picture and forms the field pair with the intra picture. For this reason, the video stream may be subject to encoding of an open GOP which includes an LP.

In the present technology, for example, the video stream may have image data of a picture of each layer obtained by encoding image data of a picture of each layer, which is obtained by classifying the image data of each picture constituting the image data in the interlacing scheme into a plurality of layers. The image decoding unit may decode encoded image data of a picture of a layer designated in layer designation information and obtain image data of a picture of a layer equal to or lower than a predetermined layer. In this case, for example, decoding commensurate with a decoding capability of the device is possible.

In addition, in the present technology, for example, a scheme conversion unit which converts image data in the interlacing scheme obtained by the image decoding unit into image data of a progressive scheme and a post-processing unit which causes a frame rate of the image data of each picture obtained by the scheme conversion unit to match a display capability may be further provided. In this case, even when the decoding capability is low, image data of a frame rate commensurate with a high display capability can be obtained.

Advantageous Effects of Invention

According to the present technology, encoding of an open GOP can also be performed for image data in an interlacing scheme. It should be noted that the effects described herein are not necessarily limitative, and any effect described in the present disclosure may be exhibited.

BRIEF DESCRIPTION OF DRAWINGS

FIG. 3 is a diagram showing a structure example (syntax) of an NAL unit header and the content (semantics) of principal parameters in the structure example.

FIG. 4 is a diagram for describing a configuration of encoded image data of each picture based on HEVC.

FIG. 5 is a diagram showing an example of hierarchical encoding of image data of the interlacing scheme performed by an encoder.

FIG. 6 is a diagram showing an example of hierarchical encoding of image data of the interlacing scheme performed by an encoder.

FIG. 7 is a diagram for describing a closed GOP and an open GOP.

FIG. 8 is a diagram showing an example of hierarchical encoding when an NAL unit type of slice of encoded image data of a picture forming a field pair with a picture of an IRAP is set to RAP_dependent.

FIG. 15 is a block diagram showing a configuration example of a post-processing unit.

DESCRIPTION OF EMBODIMENTS

Hereinafter, embodiments for implementing this technology (hereinafter referred to as "embodiments") will be described. Note that description will be provided in the following order.

1. Embodiment
2. Modified example

1. Embodiment

Transmission and Reception System

Figure 1:
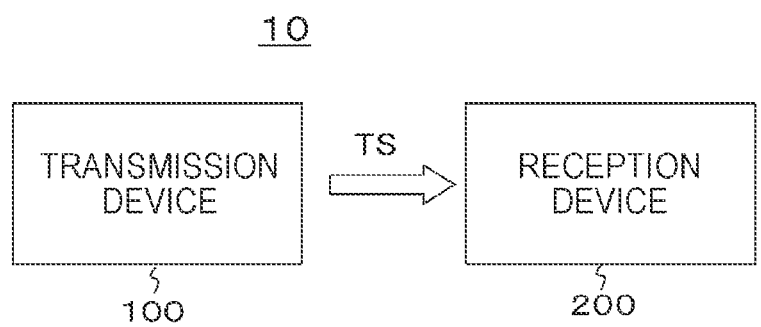
FIG. 1 is a block diagram showing a configuration example of a transmission and reception system of an embodiment.

FIG. 1 shows a configuration example of a transmission and reception system 10 as an embodiment. This transmission and reception system 10 is configured to have a transmission device 100 and a reception device 200.

The transmission device 100 transmits a transport stream TS as a container by causing the stream to be carried on broadcast waves. The transport stream TS includes a video stream having encoded image data of each of pictures which is obtained by encoding image data of the pictures which constitute image data of the interlacing scheme in the NAL unit structure. In this embodiment, image data of the interlacing scheme is encoded in the High Efficiency Video Coding (HEVC) scheme.

In addition, this video stream is set to have encoded data of image data of pictures of each layer which is obtained by classifying image data of each picture constituting image data of the interlacing scheme into a plurality of layers. In this case, encoding is performed such that a reference source picture is affiliated to its own layer and/or a layer lower than its own layer.

Layer identification information for identifying an affiliated layer of each picture is added to encoded image data of pictures of each layer. Layer identification information ("nuh_temporal id_plus1" which means temporal_id) is disposed in the header part of an NAL unit (nal_unit) of each picture. By adding the layer identification information in this manner, a reception side can selectively take out encoded image data of a layer equal to or lower than a predetermined layer and perform a decoding process thereon.

Figure 2:
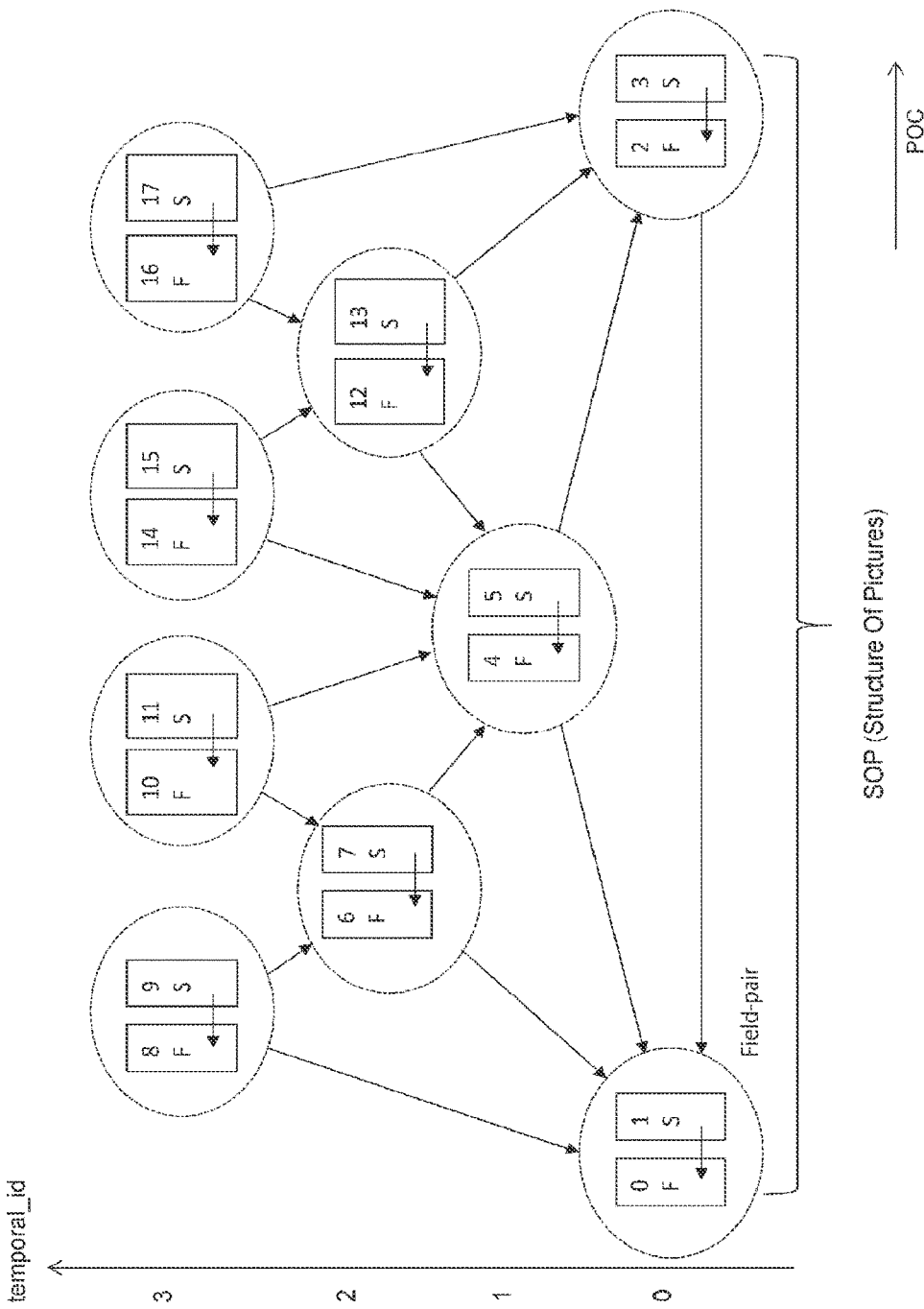
FIG. 2 is a diagram showing an example of hierarchical encoding of image data of the interlacing scheme performed by an encoder.

FIG. 2 shows an example of hierarchical encoding performed by an encoder. In this example, layers are classified into four layers from 0 to 3, and encoding is performed on image data of pictures of each of the layers. The vertical axis represents layers. 0 to 3 are respectively set as temporal_id (layer identification information) which is disposed in the header part of an NAL unit (nal_unit) which constitutes encoded image data of pictures in Layers 0 to 3. The horizontal axis represents a display order (picture order of composition (POC)) with the left side thereof representing earlier positions and the right side thereof representing later positions in that order.

FIG. 3(a) shows a structure example (syntax) of the header of an NAL unit, and FIG. 3(b) shows the content (semantics) of principal parameters in the structure example. The one-bit field of "forbidden_zero_bit" should have 0. The six-bit field of "nal_unit_type" represents the type of NAL unit. The six-bit field of "nuh_layer_id" is assumed to have 0. The three-bit field of "nuh_temporal_id_plus1" represents temporal_id, and has the value obtained by adding one (1 to 7).

Returning to FIG. 2, each of the rectangular frames represents a picture, and the number therein represents the position of a picture being encoded, i.e., in an encoding order (decoding order on a reception side). The solid-line arrows represent encoding reference relations between pictures. A structure of pictures (SOP) is constituted with 16 pictures from "0" to "17" (excluding "2" and "3"), and "0" is the leading picture. "2" is the leading picture of the next SOP. Alternatively, excluding "0" and "1," the structure of pictures (SOP) is constituted by 16 pictures from "2" to "3" and up to "17," and in this case, "2" is the leading picture of the SOP. Two pictures surrounded by a dotted-line oval represent a field pair, "F" represents a first field (top field), and "S" represents a second field (bottom field). It should be noted that layers of two pictures forming a field pair are the same.

The picture of "1" can be the leading picture of a group of pictures (GOP). Encoded image data of the leading picture of a GOP is composed of NAL units that are AUD, VPS, SPS, PPS, PSEI, SLICE, SSEI, and EOS as shown in FIG. 4. On the other hand, a picture other than the leading picture of the GOP is composed of NAL units that are AUD, PPS, PSEI, SLICE, SSEI, and EOS. The VPS can be transmitted along with the SPS once in a sequence (GOP), and the PPS can be transmitted for each picture.

In the present embodiment, encoding of an open GOP is possible. In other words, an NAL unit type of a slice of encoded image data of a picture forming a field pair with a picture of an IRAP is set to a unique type which indicates a picture that is dependent on the picture of the IRAP and forms the field pair with the picture of the IRAP.

In encoding in the HEVC scheme, an intra random access point (IRAP), a trailing picture (TP), and a leading picture (LP) are defined as the NAL unit types of a slice. An "IRAP"

indicates an intra picture constituting a random access point, and includes each type of "BLA_W_LP", "BLA_W_RADL," "BLA_N_LP," "IDR_W_RADL," "IDR_N_LP," and "CRA_NUT."

A "TP" indicates a picture later in a decoding order than the IRAP and later in a display order than the IRAP, and includes each type of "TRAIL_N" and "TRAIL_R." An "LP" indicates a picture later in a decoding order than the IRAP and earlier in a display order than the IRAP, and includes each type of "RADL_N," "RADL_R," "RASL_N," and "RASL_R."

Originally, a picture forming a field pair with a picture of an IRAP becomes a TP later in a decoding order than the IRAP and later in a display order than the IRAP. In this case, only the TP can serve as a succeeding picture as shown in FIG. 5, leaving no room for insertion of an LP, and thus encoding of an open GOP is not possible.

In this embodiment, a type called "RAP_dependent" is newly defined. This type indicates a picture which is not a picture of an IRAP but is dependent on a picture of an IRAP, and forms a field pair with the picture of the IRAP. Accordingly, an NAL unit type of a slice of encoded image data of a picture forming a field pair with a picture of an IRAP is set to RAP_dependent. In this case, an LP can be inserted as a succeeding picture, and thus encoding of an open GOP is possible.

The concepts of a closed GOP and an open GOP will be described. FIG. 7(a) schematically shows a closed GOP. A closed GOP is a GOP in which the leading I-picture in a decoding order is an instantaneous decoding refresh (IDR) picture. FIG. 7(b) schematically shows an open GOP. An open GOP is a GOP in which the leading I-picture in a decoding order is a non-IDR picture.

As shown in the drawing, an N-th GOP is assumed to be a GOP Nth and an (N−1)-th GOP is assumed to be a GOP (N−1)th. In a GOP Nth, an IDR picture comes first in a decoding order, an LP comes next, and a TP comes next after that. In addition, in the GOP Nth, an LP comes first in a display order, an IDR picture of a non-IDR picture comes next, and a TP comes next after that.

In the case of a closed GOP, when decoding starts from the beginning of a GOP Nth, decoding of all pictures included in the GOP Nth is guaranteed. In other words, the IDR picture is decoded first and then the LP is decoded. This LP is prohibited from overtaking the IDR picture in the decoding order to refer to a GOP (N−1)th. For this reason, when there is an LP, the LP is permitted only to refer to a picture include in the GOP Nth, and thus it can be decoded without information of the GOP (N−1)th. Likewise, since a TP is also prohibited to refer to the GOP (N−1)th, it can be decoded without information of the GOP (N−1)th.

On the other hand, in the case of an open GOP, when decoding starts from the beginning of a GOP Nth, an LP which is earlier than a non-IDR picture in a display order is permitted to refer to a GOP (N−1)th, and thus it may be undecodable. It should be noted that, since a TP is prohibited from referring to the GOP (N−1)th, it can be decoded without information of the GOP (N−1)th.

In this manner, when decoding starts from the beginning of a GOP Nth, all pictures included in the GOP Nth, can be decoded in the case of a closed GOP, but in the case of an open GOP, it is not possible to decode an LP. On the other hand, since referring to a GOP (N−1)th is not permitted in the case of a closed GOP, a bit rate thereof becomes higher than an open GOP to obtain the same image quality. For this reason, a closed GOP and an open GOP were separately used according to a situation in the past.

FIG. 8 shows an example of hierarchical encoding when an NAL unit type of a slice of encoded image data of a picture forming a field pair with a picture of an IRAP is set to RAP_dependent. The vertical axis represents layers. The horizontal axis represents a display order (picture order of composition or POC) with the left side thereof representing earlier display times and the right side thereof representing later display times. In this example, layers are classified into four layers of 0 to 3 and encoding is performed on image data of pictures of each of the layers as in the example of FIG. 2 described above.

In this example, each of the rectangular frames represents a picture, and the number therein represents the position of a picture being encoded, i.e., in the encoding order (decoding order on the reception side). The solid-line arrows represent encoding reference relations between pictures. Two pictures surrounded by a dotted-line oval represent a field pair, "F" represents a first field (top field), and "S" represents a second field (bottom field).

In this example, a picture of "0" in Layer 0 is encoded as a picture of an IRAP. Next, a picture of "1" forming a field pair with the picture of "0" is encoded as a picture of RAP_dependent. Then, pictures of "2" to "15" in Layers 1 to 3 are encoded as LPs, and then pictures of "16" and "17" in Layer 0 and pictures of "18" to "31" in Layers 1 to 3 are encoded as TPs.

In this example, by encoding the picture of "1" forming a field pair with the picture of "0" which is the picture of the IRAP as a picture of RAP_dependent, insertion of an LP thereafter is possible. For this reason, encoding of an open GOP is possible.

It should be noted that enabling an LP to be inserted as a succeeding picture by setting an NAL unit type of a slice of encoded image data of a picture forming a field pair with a picture of an IRAP to RAP_dependent is not limited in hierarchical encoding.

Figure 9:
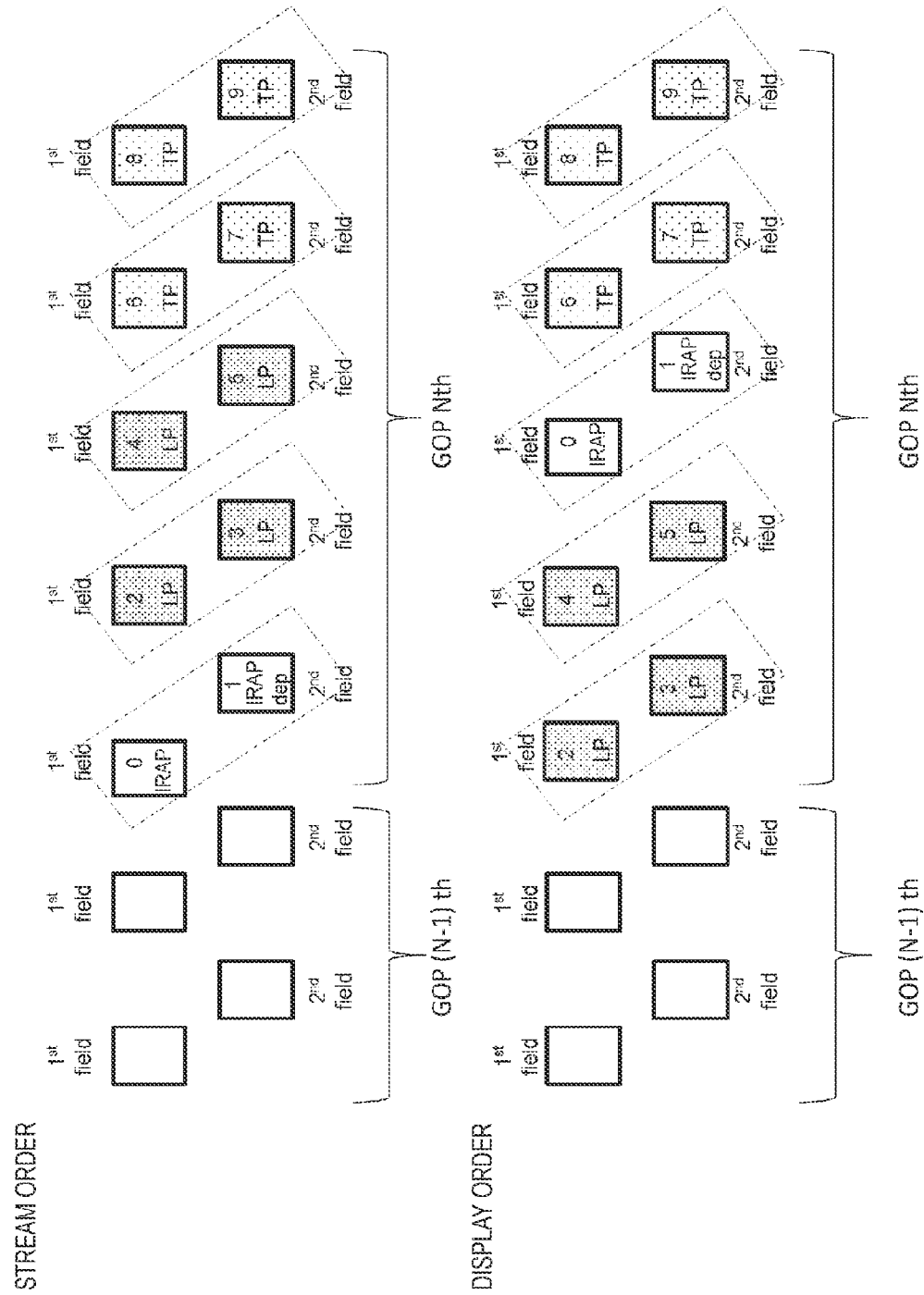
FIG. 9 is a diagram showing an example of encoding of image data of the interlacing scheme by an encoder.

FIG. 9 shows an example of encoding in a stream order and a display order. In this example, an N-th GOP is assumed to be a GOP Nth, and an (N−1)-th GOP is assumed to be a GOP (N−1)th. In addition, each of the solid-line rectangular frames represent a picture, and the number therein represents the position of a picture being encoded, i.e., in an encoding order (a decoding order on a reception side). Two pictures surrounded by a dashed-line rectangular frame represent a field pair with a first field (top field) and a second field (bottom field).

In this example, each picture of the GOP Nth is encoded as below, and thereby a video stream is generated. In other words, the picture of "0" is encoded as a picture of the IRAP. Next, the picture of "1" forming a field pair with the picture of "0" is encoded as a picture of RAP_dependent. Then, the pictures of "2" to "5" positioned before the picture of "0" in the display order are encoded as LPs, and then the pictures of "6" to "9" positioned after the picture of "1" in the display order are encoded as TPs.

In this example, by encoding the picture of "1" as a picture of RAP_dependent as described above, insertion of an LP thereafter is possible. Thus, encoding of an open GOP is possible.

Figure 10:
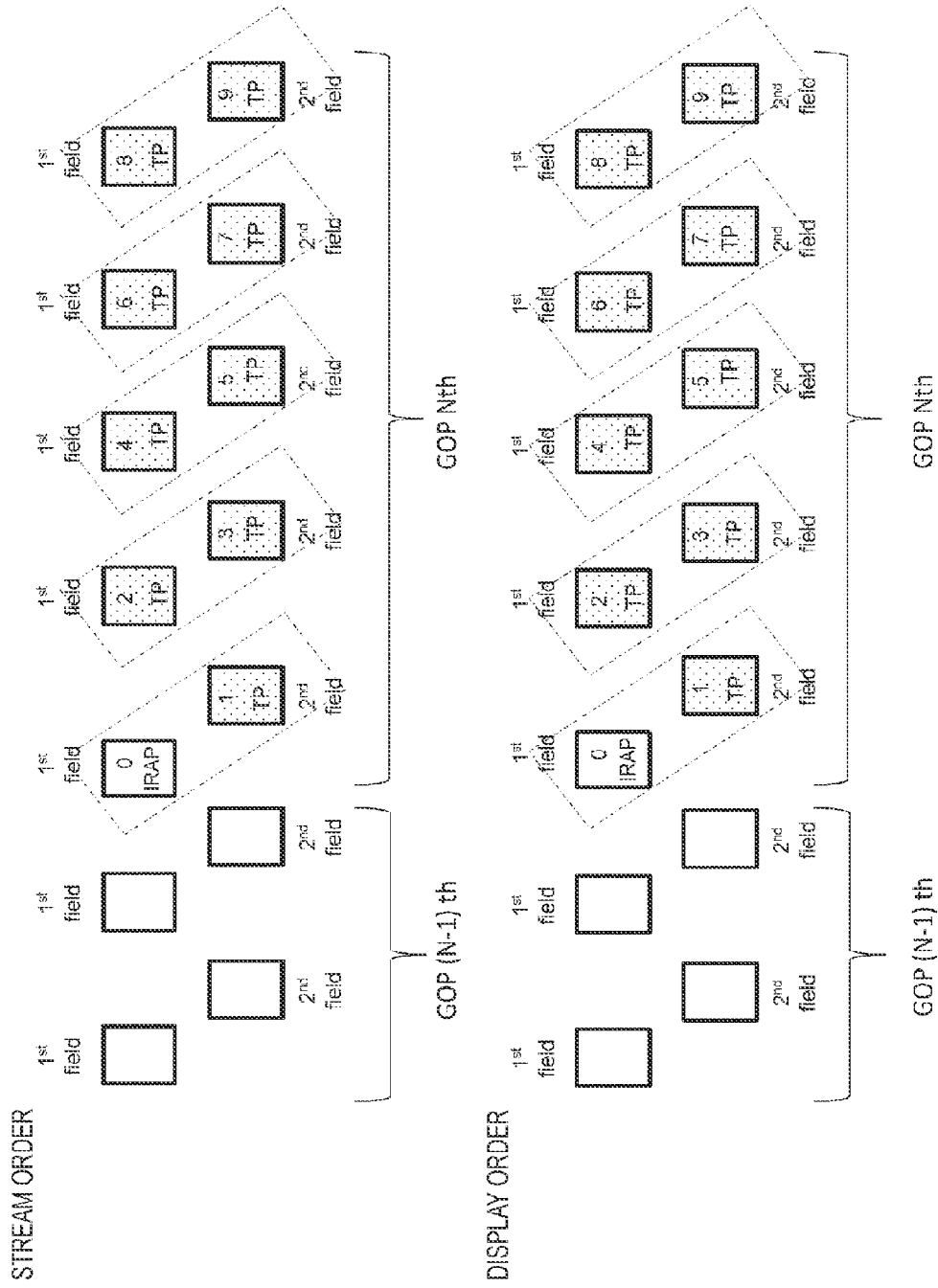
FIG. 10 is a diagram showing another example of encoding of image data of the interlacing scheme by an encoder.

FIG. 10 also shows an example of encoding in a stream order and a display order. This example shows a case in which an NAL unit type of a slice of encoded image data of a picture forming a field pair with a picture of an IRAP is set to a TP, rather than RAP_dependent.

In this example, the respective pictures of the GOP Nth are encoded as below, and thereby a video stream is generated. In other words, the picture of "0" is encoded as a picture of an IRAP. Next, the picture of "1" forming the field pair with the picture of "0" is encoded as a TP. Then, the pictures of "2" to "9" positioned after the picture of "1" in the display order are encoded as TPs.

In this example, by encoding the picture of "1" as a TP as described above, succeeding pictures become only TPs. For this reason, encoding of an open GOP that is based on the premise of insertion of an LP is not possible.

Returning to FIG. 1, the reception device 200 receives the transport stream TS carried on and sent by broadcast waves from the transmission device 100. The reception device 200 selectively takes and decodes encoded image data of a layer equal to or lower than a predetermined layer from a video stream included in this transport stream TS according to its own decoding capability, acquires image data of each of pictures, and thereby obtains image data in the interlacing scheme.

In addition, the reception device 200 converts the image data in the interlacing scheme obtained through the decoding described above into image data in a progressive scheme, and further performs post-processing to cause the frame rate thereof to match a display capability. Through this post-processing, it is possible to obtain image data of a frame rate commensurate with a high display capability even when, for example, a decoding capability is low.

[Configuration of Transmission Device]

Figure 11:
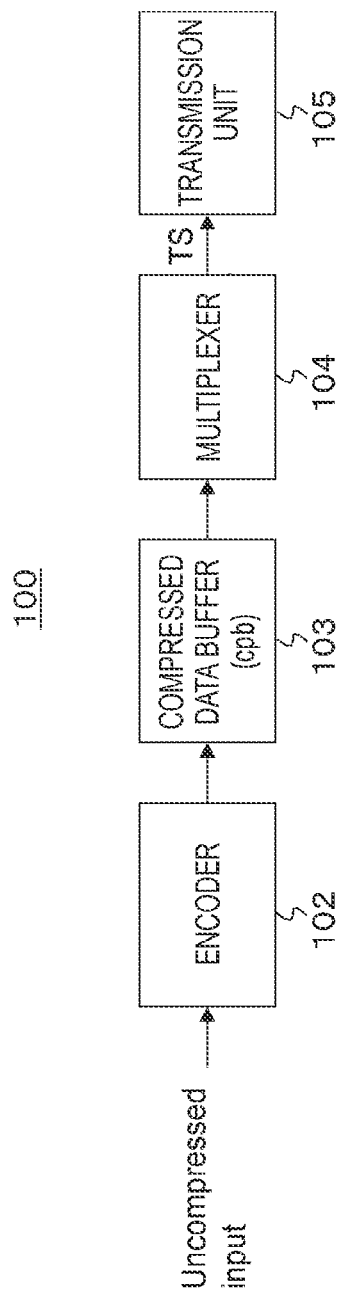
FIG. 11 is a block diagram showing a configuration example of a transmission device.

FIG. 11 shows a configuration example of the transmission device 100. This transmission device 100 has an encoder 102, a compressed data buffer (coded picture buffer or cpb) 103, a multiplexer 104, and a transmission unit 105.

The encoder 102 receives an input of uncompressed image data in the interlacing scheme and performs hierarchical encoding in the HEVC scheme. The encoder 102 classifies image data of each of pictures constituting the image data in the interlacing scheme into a plurality of layers, and generates a video stream having encoded data of the image data of pictures of each layer. In this case, the encoder 102 encodes data such that a picture to be referred to (reference source picture) is affiliated to its own layer and/or a layer lower than its own layer (see FIG. 2).

At this time, the encoder 102 encodes each picture such that encoding of the open GOP becomes possible. In other words, the encoder 102 sets an NAL unit type of a slice of encoded image data of a picture forming a field pair with a picture of an IRAP to a unique type which indicates a picture that is dependent on the picture of the IRAP and forms the field pair with the picture of the IRAP. In this embodiment, this unique type is the newly defined "RAP_dependent" as described above (see FIGS. 8 and 9).

Figure 12:
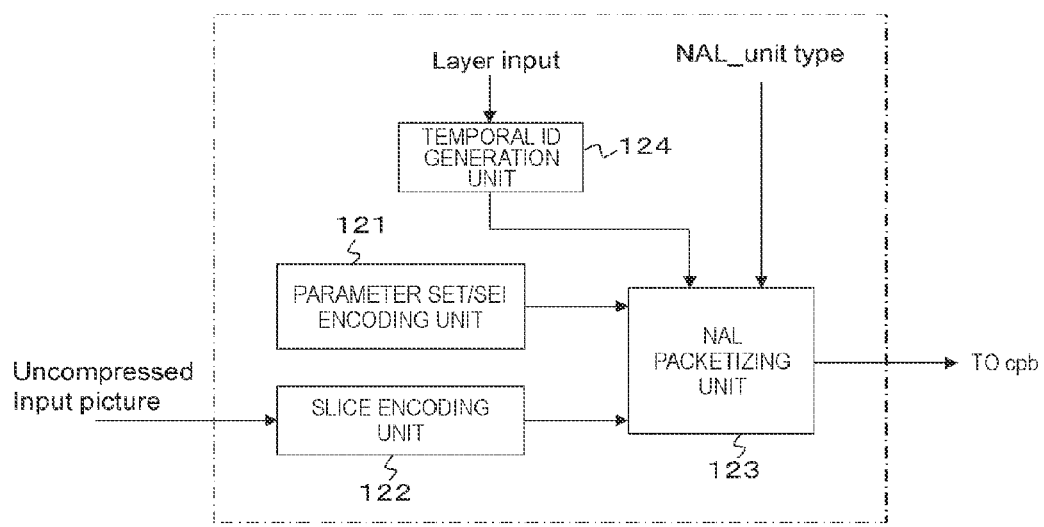
FIG. 12 is a block diagram showing a configuration example of an encoder.

FIG. 12 shows a configuration example of the encoder 102. This encoder 102 has a parameter set/SEI encoding unit 121, a slice encoding unit 122, an NAL packetizing unit 123, and a temporal ID generation unit 124.

The parameter set/SEI encoding unit 121 generates parameter sets such as a VPS, an SPS, a PPS, and the like and SEI of pictures of each layer according to the number of streams to be encoded. The slice encoding unit 122 obtains slice data by encoding image data of pictures of each layer.

The NAL packetizing unit 123 generates encoded image data of the pictures of each layer based on the parameter sets and SEI generated by the parameter set/SEI encoding unit 121 and the slice data generated by the slice encoding unit 122, and obtains video streams (encoded streams).

The temporal ID generation unit 124 generates temporal_id for each picture to be encoded based on layer information of the picture, and sends the data to the NAL packetizing unit 123. The NAL packetizing unit 123 receives information of the NAL unit type of each picture to be encoded. The NAL packetizing unit 123 inserts temporal_id corresponding to a picture of each layer into the header of the NAL unit constituting encoded image data of the picture and further sets an NAL unit type (see FIG. 3).

Returning to FIG. 11, the compressed data buffer (cpb) 103 temporarily accumulates a video stream including the encoded data of the pictures of each layer obtained by the encoder 102. The multiplexer 104 reads the video stream accumulated in the compressed data buffer 103, makes them into PES packets, further makes them into transport packets and multiplexes them, and thereby obtains a transport stream TS as a multiplexed stream.

This transport stream TS includes a single video stream having the encoded image data of the pictures of each layer, or a predetermined number of video streams having the encoded image data of the pictures of each layer set that is obtained by dividing the plurality layers into a predetermined number of layer sets, the number being equal to or greater than two. The multiplexer 104 inserts layer information and stream configuration information into the transport stream TS.

As one of program specific information (PSI), the transport stream TS includes a program map table (PMT). This PMT has a video elementary loop (video ES1 loop) with information relating to each video stream. In this video elementary loop, information of a stream type, a packet identifier (PID), and the like as well as a descriptor describing the information relating to the video stream are disposed to correspond to each video stream.

The transmission unit 105 modulates the transport stream TS in a modulation scheme proper for broadcasting, for example, QPSK-OFDM, and transmits an RF modulation signal from a transmission antenna.

An operation of the transmission device 100 shown in FIG. 11 will be briefly described. The encoder 102 receives an input of uncompressed image data in an interlacing scheme. The encoder 102 performs hierarchical encoding on this image data in an HEVC scheme. In other words, the encoder 102 classifies image data of respective pictures constituting the image data into a plurality of layers and encodes the data, and thereby generates a video stream having encoded image data of the pictures of each layer. At this time, encoding is performed such that a picture to be referred to is affiliated to its own layer and/or a layer lower than its own layer.

In addition, at this time, each picture is encoded such that encoding of an open GOP becomes possible. In other words, an NAL unit type of a slice of encoded image data of a picture forming a field pair with a picture of an IRAP is set to "RAP_dependent" which is a unique type which indicates a picture that is dependent on the picture of the IRAP and forms the field pair with the picture of the IRAP.

The video stream which is generated by the encoder 102, including the encoded data of the pictures of each layer, is supplied to the compressed data buffer (cpb) 103 and temporarily stored therein. In the multiplexer 104, the video stream accumulated in the compressed data buffer 103 is read, PES packetized, and further transport packetized and multiplexed, and thereby a transport stream TS is obtained as a multiplexed stream.

The transport stream TS obtained by the multiplexer 104 is sent to the transmission unit 105. In the transmission unit 105, the transport stream TS is modulated in a modulation scheme proper for broadcasting, for example, QPSK-OFDM, and an RF modulation signal is transmitted from a transmission antenna.

[Configuration of a Reception Device]

Figure 13:
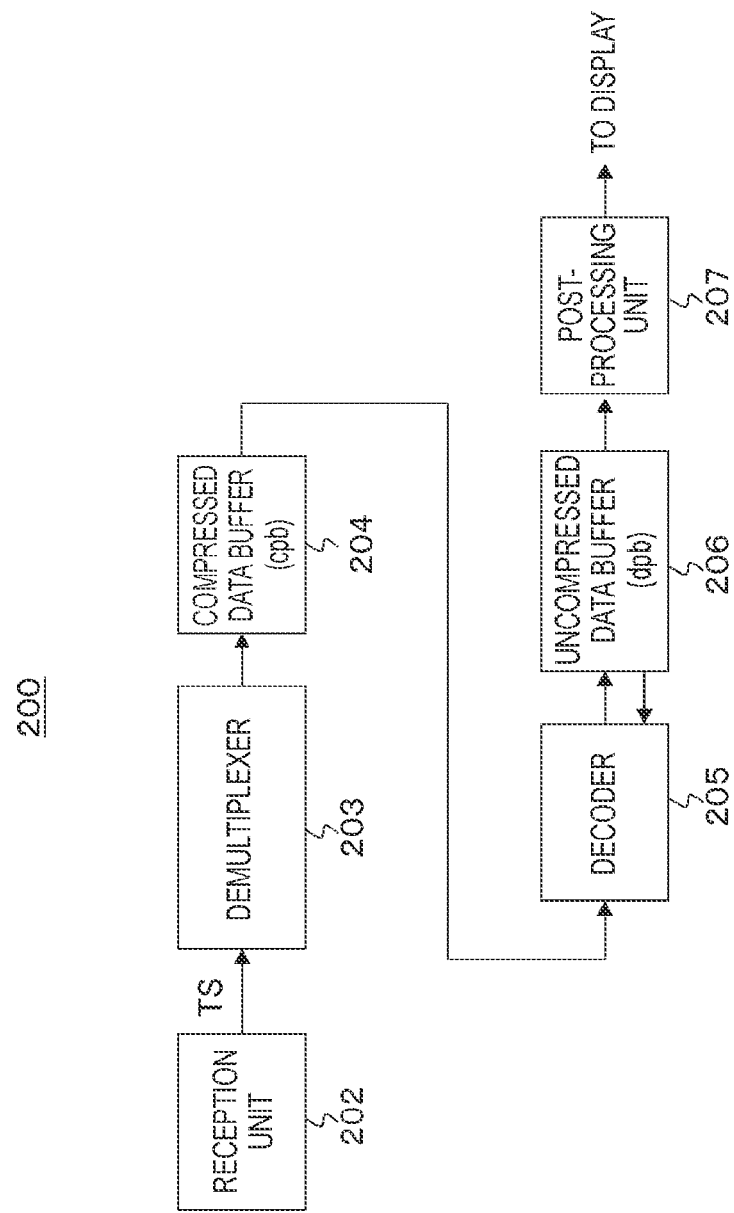
FIG. 13 is a block diagram showing a configuration example of a reception device.

FIG. 13 shows a configuration example of the reception device 200. This reception device 200 has a reception unit 202, a demultiplexer 203, and a compressed data buffer (coded picture buffer or cpb) 204. Further, the reception device 200 has a decoder 205, an uncompressed data buffer (decoded picture buffer or dpb) 206, and a post-processing unit 207.

The reception unit 202 demodulates an RF modulation signal received by a reception antenna to acquire the transport stream TS. The demultiplexer 203 takes out a video stream (encoded stream) by performing a depacketizing process on the transport stream TS and sends the stream to the compressed data buffer (coded picture buffer or cpb) 204.

The compressed data buffer (cpb) 204 temporarily accumulates the video stream taken out by the demultiplexer 203. The decoder 205 takes out encoded image data of pictures of a layer that has been designated as a layer to be decoded from the video stream accumulated in the compressed data buffer 204. Then, the decoder 205 decodes the taken encoded image data of each picture at each decoding timing of the picture, and sends the data to the uncompressed data buffer (dpb) 206. When decoding the encoded image data of each picture, the decoder 205 reads and uses image data of a reference source picture from the uncompressed data buffer 206 when necessary.

Figure 14:
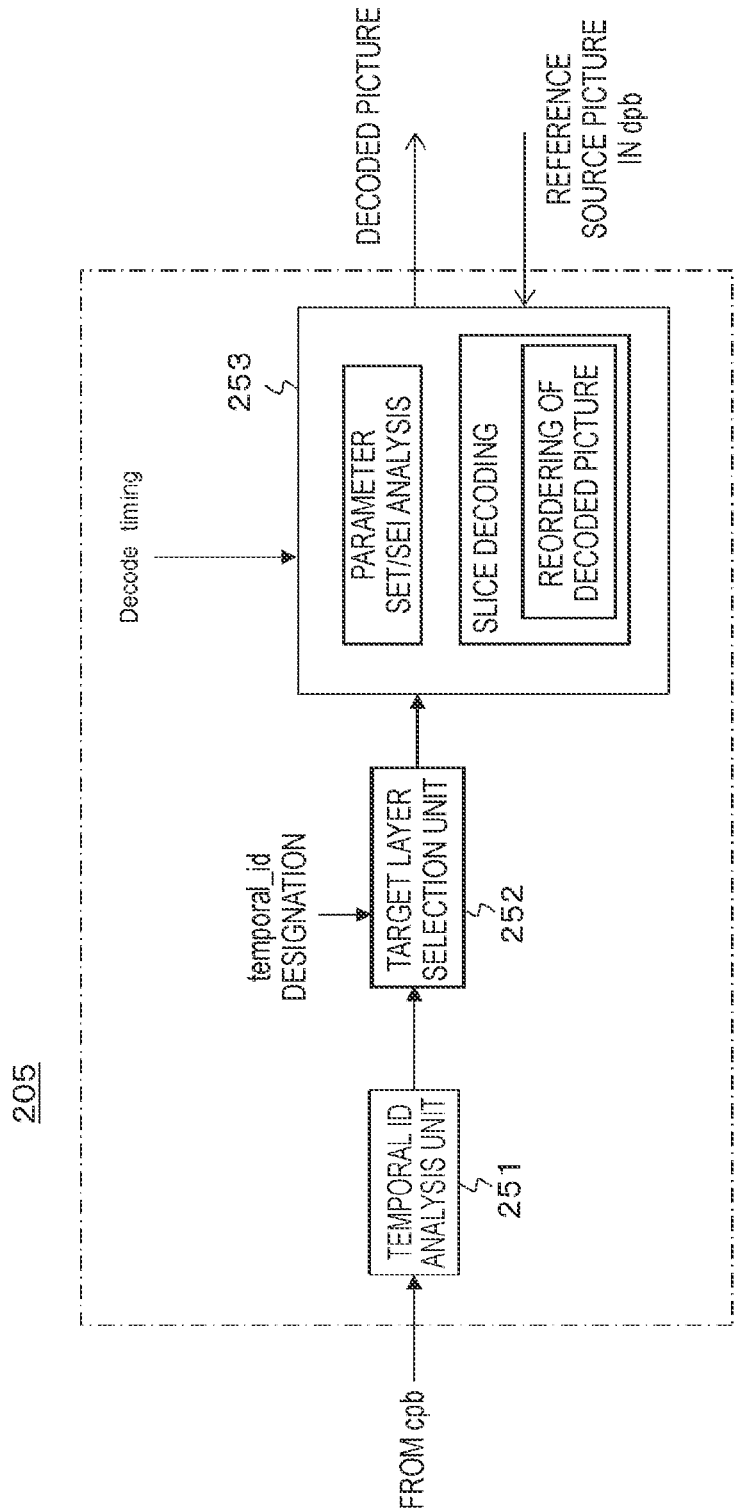
FIG. 14 is a block diagram showing a configuration example of a decoder.

FIG. 14 shows a configuration example of the decoder 205. This decoder 205 has a temporal ID analysis unit 251, a target layer selection unit 252, and a decoding unit 253. The temporal ID analysis unit 251 reads the video stream (encoded stream) accumulated in the compressed data buffer 204 and analyzes temporal_id inserted into the NAL unit header of the encoded image data of each picture.

The target layer selection unit 252 takes out encoded image data of each picture of a layer designated as a layer to be decoded from the video stream read from the compressed data buffer 204 based on the analysis result of the temporal ID analysis unit 251, and sends the data to the decoding unit 253. The decoding unit 253 sequentially decodes the encoded image data of each picture acquired by the target layer selection unit 252 at decoding timings, and sends the data to the uncompressed data buffer (dpb) 206.

In this case, the decoding unit 253 analyzes the VPS and the SPS to ascertain a level designation value of a bit rate of each sublayer "sublayer_level_idc," and checks whether decoding is possible within the decoding capability. In addition, in this case, the decoding unit 253 analyzes the SEI to ascertain, for example, "initial_cpb_removal_time" and "cpb_removal_delay," and checks whether a decoding timing is proper. Alternatively, decoding is started at a decoding timing obtained from a DTS (decoding timestamp) obtained by the demultiplexer 203. In addition, display is performed at a display timing obtained from a PTS (presentation timestamp) obtained by the demultiplexer 203.

The decoding unit 253 acquires information which indicates a prediction destination in a time direction from a slice header when a slice is decoded to perform time-direction prediction. In addition, when a slice is decoded, the decoding unit 253 manages a reading order after decoding for each type of the IRAP, RAP_dependent, an LP and a TP described in the NAL unit type of the NAL unit header.

Returning to FIG. 13, the uncompressed data buffer (dpb) 206 temporarily accumulates the image data of each picture decoded by the decoder 205. The post-processing unit 207 converts the image data in the interlacing scheme sequentially read from the uncompressed data buffer (dpb) 206 at display timings into image data in the progressive scheme. Furthermore, the post-processing unit 207 performs a process of causing the frame rate of the image data of each picture converted into the progressive scheme to match the display capability.

For example, when the frame rate of the decoded image data of the pictures is 120 fps and the display capability is 120 fps, the post-processing unit 207 sends the decoded image data of the pictures to a display as it is. In addition, when, for example, the frame rate of the decoded image data of the pictures is 120 fps and the display capability is 60 fps, the post-processing unit 207 performs a subsampling process so that time-direction resolution is half that of the decoded image data of the pictures, and sends the data to the display as image data of 60 fps.

In addition, when the decoded image data of each picture has an interlaced field rate of 60 fps and the display capability thereof is a progressive frame rate of 120 fps, the post-processing unit 207 performs I-P conversion on the decoded image data of each picture to set the progressive frame rate to 60 fps, further performs an interpolation process to set time direction resolution to twice that of pictures of the 60 fps, and sends the data to a display as image data of 120 fps. In addition, for example, when image data of each picture after decoding has a frame rate of 60 fps and the display capability thereof is 60 fps, the post-processing unit 207 sends the decoded image data of each picture directly to the display.

FIG. 15 shows a configuration example of the post-processing unit 270. This is an example which can deal with the case described above in which the frame rate of the decoded image data of the pictures is 120 fps or 60 fps and the display capability is 120 fps or 60 fps, The post-processing unit 207 has an I-P conversion unit 271, an interpolation unit 272, a subsampling unit 273, and a switching unit 274. The I-P conversion unit 271 converts image data of each picture after decoding (image data in the interlacing scheme) from the uncompressed data buffer 206 into image data in the progressive scheme.

The interpolation unit 272 performs an interpolation process in the time direction on the image data obtained by the I-P conversion unit 271 to double the frame rate. The subsampling unit 273 performs a subsampling process in the time direction on the image data obtained by the I-P conversion unit 271 to halve the frame rate. The switching unit 274 selectively outputs any output image data of the I-P conversion unit 271, the interpolation unit 272, and the subsampling unit 273 based on selection information.

The selection information is automatically generated by, for example, a control unit that is not illustrated or according to a user operation. Accordingly, image data of each picture sequentially read from the uncompressed data buffer (dpb) 206 at display timings is converted into the progressive scheme, and the frame rate matches the display capability.

An operation of the reception device 200 shown in FIG. 15 will be briefly described. The reception unit 202 demodulates the RF modulation signal received by the reception antenna to acquire the transport stream TS. This transport stream TS is sent to the demultiplexer 203. The demultiplexer 203 takes a video stream (encoded stream) by performing a depacketizing process on the transport stream TS. This video stream is sent to and temporarily accumulated in the compressed data buffer (cpb) 204.

The decoder 205 takes the encoded image data of the pictures of the layer designated as a layer to be decoded from the video stream accumulated in the compressed data buffer 204. Then, the decoder 205 decodes the encoded image data of each of the taken pictures at decoding timings of the pictures, and sends the data to the uncompressed data buffer (dpb) 206 to cause the data to be temporarily stored. In this case, when the encoded image data of the respective pictures is to be decoded, image data of a reference source picture is read from the uncompressed data buffer 206 to be used.

The image data of the pictures sequentially read from the uncompressed data buffer (dpb) 206 at display timings is sent to the post-processing unit 207. The post-processing unit 207 converts the image data in the interlacing scheme into image data in the progressive scheme, and further performs an interpolation process or a subsampling process on the image data of each picture converted into the progressive scheme to cause the frame rate thereof to match the display capability. The image data of the pictures processed by the post-processing unit 207 is supplied to the display and a dynamic image of the image data of the pictures is displayed.

As described above, in the transmission and reception system 10 shown in FIG. 1, when image data in the interlacing scheme is encoded in the HEVC scheme, the transmission side sets an NAL unit type of a slice of encoded image data of a picture forming a field pair with an intra picture constituting a random access point to a unique type which indicates a picture that is dependent on the intra picture and forms the field pair with the intra picture (to "RAP_dependent"). Thus, inserting an LP as a succeeding picture becomes possible and thereby encoding of an open GOP becomes possible.

2. Modified Example

It should be noted that, although the above-described embodiment shows the transmission and reception system 10 constituted by the transmission device 100 and the reception device 200, a configuration of a transmission and reception system to which the present technology can be applied is not limited thereto. For example, the reception device 200 part may be configured with a set-top box connected with a digital interface such as High-Definition Multimedia Interface (HDMI) and a monitor, or the like. Note that "HDMI" is a registered trademark.

In addition, although a case of an interlaced-type image has been described in the above embodiment, also in the case of a progressive-type image, a picture is allowed to be disposed later than an IRAP in its decoding order and display order due to the type of RAP_dependent, and thus a stream in which LPs and RPs are flexibly arranged can be configured.

In addition, the above-described embodiment shows the example in which the container is a transport stream (MPEG-2 TS). The present technology, however, can also be similarly applied to a system configured to distribute data to a reception terminal using a network such as the Internet. In distribution on the Internet, there are many cases of distribution using a container in MP4 or other formats. In other words, as containers, various formats including transport streams (MPEG-2 TS) employed in digital broadcasting standards, MP4 used in Internet distribution, and the like are equivalent thereto.

Additionally, the present technology may also be configured as below.

(1)

An encoding device including:
an image encoding unit configured to encode image data of each picture constituting image data in an interlacing scheme in an NAL unit structure and generate a video stream having the encoded image data of each picture,
wherein the image encoding unit sets an NAL unit type of a slice of encoded image data of a picture forming a field pair with an intra picture constituting a random access point to a unique type which indicates a picture that is dependent on the intra picture and forms the field pair with the intra picture.

(2)

The encoding device according to (1), wherein the image encoding unit classifies the image data of each picture constituting the image data in the interlacing scheme into a plurality of layers, encodes image data of a picture of each classified layer, and generates a video stream having the encoded image data of the picture of each layer.

(3)

The encoding device according to (1) or (2), wherein the image encoding unit encodes the image data in the interlacing scheme in an HEVC scheme.

(4)

An encoding method including:
an image encoding step by an image encoding unit of encoding image data of each picture constituting image data in an interlacing scheme in an NAL unit structure and generating a video stream having the encoded image data of each picture,
wherein, in the image encoding step, an NAL unit type of a slice of encoded image data of a picture forming a field pair with an intra picture constituting a random access point is set to a unique type which indicates a picture that is dependent on the intra picture and forms the field pair with the intra picture.

(5)

A transmission device including:
an image encoding unit configured to encode image data of each picture constituting image data in an interlacing scheme in an NAL unit structure and generate a video stream having the encoded image data of each picture; and
a transmission unit configured to transmit a container in a predetermined format which includes the generated video stream,
wherein the image encoding unit sets an NAL unit type of a slice of encoded image data of a picture forming a field pair with an intra picture constituting a random access point to a unique type which indicates a picture that is dependent on the intra picture and forms the field pair with the intra picture.

(6)

A decoding device including:
an image decoding unit configured to decode a video stream having encoded image data of each picture obtained by encoding image data of each picture constituting image data in an interlacing scheme in an NAL unit structure to obtain the image data in the interlacing scheme,
wherein, in the video stream, an NAL unit type of a slice of encoded image data of a picture forming a field pair with an intra picture constituting a random access point is set to a unique type which indicates a picture that is dependent on the intra picture and forms the field pair with the intra picture.

(7)

The decoding device according to (6),
wherein the video stream has image data of a picture of each layer obtained by encoding image data of a picture of each layer, which is obtained by classifying the image data of each picture constituting the image data in the interlacing scheme into a plurality of layers, and wherein the image decoding unit decodes encoded image data of a picture of a layer designated in layer designation information and obtains image data of a picture of a layer equal to or lower than a predetermined layer.

(8)

The decoding device according to (6) or (7), further including:

a scheme conversion unit configured to convert the image data in the interlacing scheme obtained by the image decoding unit into image data in a progressive scheme; and a post-processing unit configured to cause a frame rate of image data of each picture obtained by the scheme conversion unit to match a display capability.

(9)

A decoding method including:

an image decoding step by an image decoding unit of decoding a video stream having encoded image data of each picture obtained by encoding image data of each picture constituting image data in an interlacing scheme in an NAL unit structure to obtain the image data in the interlacing scheme, wherein, in the video stream, an NAL unit type of a slice of encoded image data of a picture forming a field pair with an intra picture constituting a random access point is set to a unique type which indicates a picture that is dependent on the intra picture and forms the field pair with the intra picture.

(10)

A reception device including:

a reception unit configured to receive a container in a predetermined format which includes a video stream having encoded image data of each picture obtained by encoding image data of each picture constituting image data in an interlacing scheme in an NAL unit structure; and an image decoding unit configured to obtain the image data in the interlacing scheme by decoding the video stream included in the received container, wherein, in the video stream, an NAL unit type of a slice of encoded image data of a picture forming a field pair with an intra picture constituting a random access point is set to a unique type which indicates a picture that is dependent on the intra picture and forms the field pair with the intra picture.

The main feature of the present technology is to enable insertion of an LP as a succeeding picture possible and encoding of an open GOP possible by setting, when image data in the interlacing scheme is encoded in the form of an NAL unit, an NAL unit type of a slice of encoded image data of a picture forming a field pair with an intra picture constituting a random access point to a unique type which indicates a picture that is dependent on the intra picture and forms the field pair with the intra picture (see FIGS. 8 and 9).

REFERENCE SIGNS LIST 10 transmission and reception system
100 transmission device
102 encoder
103 compressed data buffer (cpb)
104 multiplexer
105 transmission unit
121 parameter set/SEI encoding unit
122 slice encoding unit
123 NAL packetizing unit
124 temporal ID generation unit
200 reception device
202 reception unit
203 demultiplexer
204 compressed data buffer (cpb)
205 decoder
206 uncompressed data buffer (dpb)
207 post-processing unit
251 temporal ID analysis unit
252 target layer selection unit
253 decoding unit
271 I-P conversion unit
272 interpolation unit
273 sub sampling unit
274 switching unit

The invention claimed is:

1. An encoding device comprising:

an image encoding unit configured to encode image data of each picture constituting image data in an interlacing scheme in an NAL unit structure and generate a video stream having the encoded image data of each picture, wherein the image encoding unit sets an NAL unit type of a slice of encoded image data of a picture forming a field pair with an intra picture constituting a random access point to a unique type which indicates a picture that is dependent on the intra picture and forms the field pair with the intra picture.

2. The encoding device according to claim 1, wherein the image encoding unit classifies the image data of each picture constituting the image data in the interlacing scheme into a plurality of layers, encodes image data of a picture of each classified layer, and generates a video stream having the encoded image data of the picture of each layer.

3. The encoding device according to claim 1, wherein the image encoding unit encodes the image data in the interlacing scheme in an HEVC scheme.

4. An encoding method comprising:

an image encoding step by an image encoding unit of encoding image data of each picture constituting image data in an interlacing scheme in an NAL unit structure and generating a video stream having the encoded image data of each picture, wherein, in the image encoding step, an NAL unit type of a slice of encoded image data of a picture forming a field pair with an intra picture constituting a random access point is set to a unique type which indicates a picture that is dependent on the intra picture and forms the field pair with the intra picture.

5. A transmission device comprising:

an image encoding unit configured to encode image data of each picture constituting image data in an interlacing scheme in an NAL unit structure and generate a video stream having the encoded image data of each picture; and a transmission unit configured to transmit a container in a predetermined format which includes the generated video stream, wherein the image encoding unit sets an NAL unit type of a slice of encoded image data of a picture forming a field pair with an intra picture constituting a random access point to a unique type which indicates a picture that is dependent on the intra picture and forms the field pair with the intra picture.

6. A decoding device comprising:

an image decoding unit configured to decode a video stream having encoded image data of each picture obtained by encoding image data of each picture constituting image data in an interlacing scheme in an NAL unit structure to obtain the image data in the interlacing scheme, wherein, in the video stream, an NAL unit type of a slice of encoded image data of a picture forming a field pair with an intra picture constituting a random access point is set to a unique type which indicates a picture that is dependent on the intra picture and forms the field pair with the intra picture.

7. The decoding device according to claim 6, wherein the video stream has image data of a picture of each layer obtained by encoding image data of a picture of each layer, which is obtained by classifying the image data of each picture constituting the image data in the interlacing scheme into a plurality of layers, and wherein the image decoding unit decodes encoded image data of a picture of a layer designated in layer designation information and obtains image data of a picture of a layer equal to or lower than a predetermined layer.

8. The decoding device according to claim 6, further comprising:

a scheme conversion unit configured to convert the image data in the interlacing scheme obtained by the image decoding unit into image data in a progressive scheme; and a post-processing unit configured to cause a frame rate of image data of each picture obtained by the scheme conversion unit to match a display capability.

9. A decoding method comprising:

an image decoding step by an image decoding unit of decoding a video stream having encoded image data of each picture obtained by encoding image data of each picture constituting image data in an interlacing scheme in an NAL unit structure to obtain the image data in the interlacing scheme, wherein, in the video stream, an NAL unit type of a slice of encoded image data of a picture forming a field pair with an intra picture constituting a random access point is set to a unique type which indicates a picture that is dependent on the intra picture and forms the field pair with the intra picture.

10. A reception device comprising:

a reception unit configured to receive a container in a predetermined format which includes a video stream having encoded image data of each picture obtained by encoding image data of each picture constituting image data in an interlacing scheme in an NAL unit structure; and an image decoding unit configured to obtain the image data in the interlacing scheme by decoding the video stream included in the received container, wherein, in the video stream, an NAL unit type of a slice of encoded image data of a picture forming a field pair with an intra picture constituting a random access point is set to a unique type which indicates a picture that is dependent on the intra picture and forms the field pair with the intra picture.

* * * * *